A. ROELANTS & H. HENEBIENS.
MACHINE SCISSORS.
APPLICATION FILED MAR. 10, 1911.
1,012,918.
Patented Dec. 26, 1911.
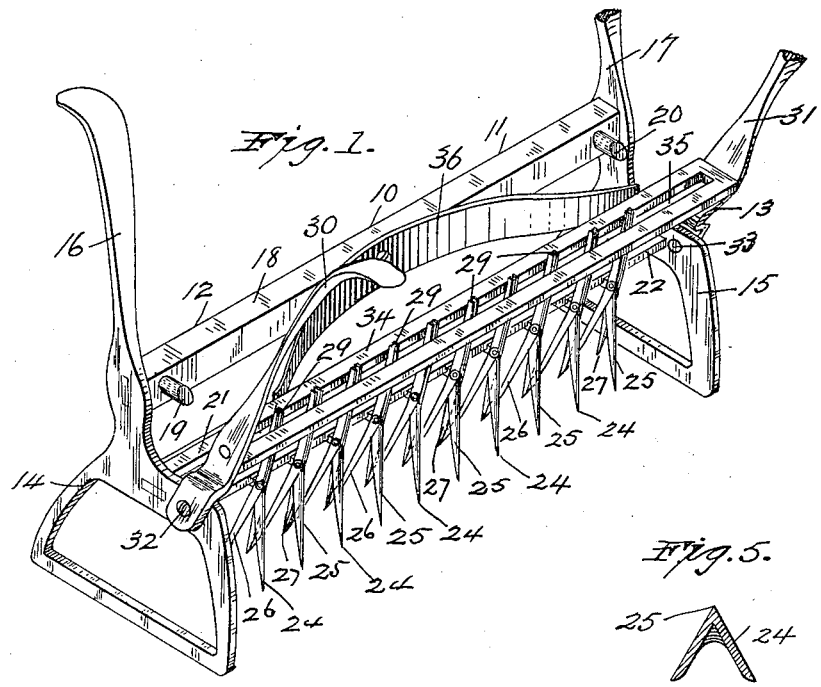
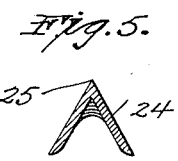
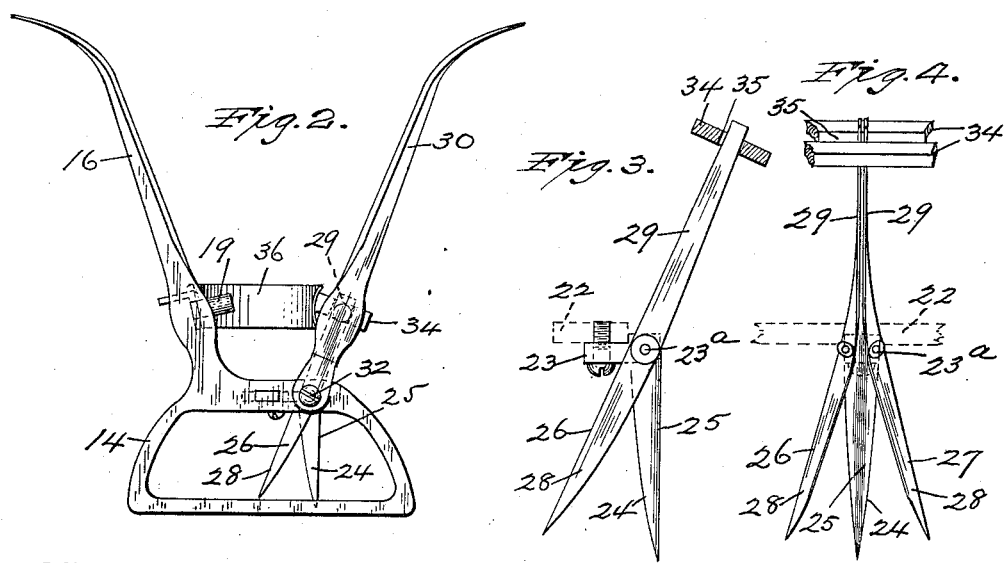

UNITED STATES PATENT OFFICE.

AUGUST ROELANTS, OF NEW YORK, N. Y., AND HENRI HENEBIENS, OF HOBOKEN, NEW JERSEY.

MACHINE-SCISSORS.

1,012,918.  Specification of Letters Patent.  Patented Dec. 26, 1911.

Application filed March 10, 1911. Serial No. 613,659.

*To all whom it may concern:*

Be it known that we, AUGUST ROELANTS and HENRI HENEBIENS, both subjects of the King of Belgium, and residents of New York, county and State of New York, and Hoboken, county of Bergen, and State of New Jersey, respectively, have invented certain new and useful Improvements in Machine-Scissors, of which the following is a full, clear, and exact specification.

This invention relates more particularly to a class of devices or scissors adapted to be used for ornamenting articles.

Our invention has for its object primarily to provide a device or form of machine scissors designed to be manually operated and employed especially by bakers for ornamenting or scoring in fanciful designs the surface of loaves of bread, pastry, or like purposes whereby the same may be made more inviting and attractive as a food product, and this is accomplished by providing a machine wherein are employed a plurality of blades adapted to be moved simultaneously so that a design may be formed by a single operation thereof, thus avoiding the waste of time and labor incident to the methods in ordinary use.

Another object of the invention is to provide a form of portable machine scissors in which any desired number of blades may be used; and to further provide a machine of simple, efficient and durable construction and which may be conveniently used.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a perspective view, partly fragmentary, of one form of machine scissors embodying our invention. Fig. 2 is an end view of the machine scissors. Fig. 3 is a side elevation of one pair of the blades of the machine. Fig. 4 is a front view thereof, and Fig. 5 is a section through one of the blades employed in the scissors.

The device or machine scissors 10 has a frame 11 composed mainly of two parts or members 12 and 13 which may be of any preferred size and made of any desired material. The part or member 12 has two end plates or feet, as 14 and 15, each of which are substantially rectangular in form, or may have tapered or converging lateral edges, as shown, and each of said end-plates or feet may be centrally cut-out so as to lessen the weight thereof. Upon the top of each of the end-plates or feet 14 and 15 and at the juncture of one of the tapered edges with the top straight-edges thereof is formed one end of a handle 16 and 17. Between the handles 16 and 17 and adjacent to the feet 14 and 15 is arranged a cross-bar 18 having in proximity to its ends two projecting stops 19 and 20. The top of each of the end-plates or feet 14 and 15 are connected by two spaced parallel arranged bars or rods 21 and 22, and at spaced intervals upon the underside of the rod 22 are connected by screws, or otherwise, one of the ends of a plurality of short arms 23, as shown in Fig. 3. Through an opening in the opposite end of each of the arms 23 is passed a bolt or pin 23$^a$ and upon each of said pins is rigidly held one end of one of the blades 24 of a plurality of scissors 25 having two blades 26 and 27 in addition to said blade 24.

Each of the blades 24 of the three bladed scissors 25 is cone-shaped, as viewed in Fig. 5, and the lengthwise edges thereof taper in form so as to provide a pointed free end. All the blades 24 are of sufficient length so that the free ends thereof will be approximately on alinement with the lower edge of the end-plates 14 and 15. Each of the pins 23$^a$ extend beyond the lateral surfaces of the blades 24, and upon each projecting end of said pins is movably held substantially the central part of the blades 26 and 27 of the scissors 25. The blades 26 and 27 are alike in size and formation. The lower portion 28 of each of the blades 26 and 27 are bent so as to be normally disposed laterally with respect to the blades 24 when the scissors are closed, as shown in Fig. 1, and one edge of said lower portions are tapered to provide pointed free ends. The upper portions 29 of each of the blades 26 and 27 are disposed in parallel arrangement adjacent to each other.

The part or member 13 of the machine scissors 10 consists of two handles 30 and 31, each having one of its ends pivotally held by bolts, 32 and 33 to the end-plates or feet 14 and 15, respectively, at the juncture of the tapered lateral edges with the top straight-edges of said end-plates which is opposite to the handles 16 and 17. Between the handles 30 and 31 is arranged a guide bar 34 having a slot or opening 35 formed therein and which extends substantially the entire length of said guide bar. In the slot 35 are disposed the ends of the upper portions 29 of the blades 26 and 27, and are movably held in said slot so as to be forced apart for guiding the lower portions 28 of said blades into contact with the outer surfaces of the cone-shaped blades 24 when the handles 30 and 31 are manually moved toward the handles 16 and 17. Each of the three blade scissors 25 will then be closed, and to score or ornament the surface of a loaf of bread or pastry the machine scissors 10 is positioned so that the pointed ends of the blades 24, 26 and 27 will slightly penetrate the surface of the bread. The handles 30 and 31 are then released and the blades 26 and 27 will swing open, as shown in Fig. 1, for scoring or ornamenting the surface of the bread before being baked. As described and illustrated, the member 13 is adapted to be moved in relative relation to the member 12 when the machine scissors are operated, and for the purpose of forcing said members apart when the handles 30 and 31 are released after being moved against the stops 19 and 20 toward the handles 16 and 17, upon the cross-bar 18 is firmly held the central part of a spring 36. The spring 36 is curved so that the ends thereof engage the edge of the guide bar 34 which will move against the tension of said spring for swinging the blades 26 and 27 open from contact with the blades 24, at the same time the handles 30 and 31 will be guided to their normal positions for the consecutive operation of the machine scissors.

In the foregoing description we have embodied the preferred form of our invention, but we do not wish to be understood as limiting ourselves thereto, as we are aware that modifications may be made therein without departing from the principle or sacrificing any of the advantages of this invention, therefore we reserve to ourselves the right to make such changes as fairly fall within the scope thereof.

Having thus described our invention, we claim as new and desire to secure by Letters Patent;

1. A machine scissors of the character described, comprising a frame composed of two members, one of said members having two substantially rectangular end plates; two handles, each having one of its ends formed upon one upper corner of each of the end-plates; a cross-bar arranged between the handles; a second member having two handles, each of which has one of its ends pivotally held to one corner of one of the end plates opposite to the handles thereof so as to be moved in relative relation to the first member; a guide rod provided between the handles of the second member; and a plurality of three-bladed scissors arranged at spaced intervals upon the guide rod, each of the blades of said scissors being of sufficient length so that one end thereof will be substantially on alinement with the lower edge of the end plates of the first member.

2. A machine scissors of the character described, comprising a frame composed of two members, one of said members having two substantially rectangular end plates; two handles, each having one of its ends formed upon one upper corner of each of the end plates; a cross-bar arranged between the handles; a second member having two handles, each of which has one of its ends pivotally held to the corner of one of the end plates opposite to the handles thereof so as to be moved in relative relation to the first member; a guide rod provided between the handles of the second member and having a slot provided lengthwise thereof; and a plurality of three-bladed scissors arranged at spaced intervals upon the guide rod, each of the blades of the scissors being of sufficient length so that one end thereof will be substantially on alinement with the lower edge of the end plates of the first member and two of said blades having one of the ends thereof movably held in the slot of the guide rod.

3. A machine scissors of the character described, comprising a frame composed of two members, one of said members having two substantially rectangular end plates; two handles, each having one of its ends formed upon one upper corner of each of the end plates; a cross-bar arranged between the handles; a second member having two handles, each of which has one of its ends pivotally held to the corner of one of the end plates opposite to the handles thereof so as to be moved in relative relation to the first member; a guide rod provided between the handles of the second member and having a slot provided lengthwise thereof; and a plurality of blades, each having one of its ends held at spaced intervals upon one edge of the guide rod; a plurality of pairs of blades of like formation, each pair having substantially the center of the blades thereof pivoted to the opposite surfaces of the end of each of the first blades which is held to the guide rod and each pair of blades having one of the ends thereof disposed in the slot of the guide rod.

4. A machine scissors of the character described, comprising a frame composed of two members, one of said members having two substantially rectangular end feet; two handles, each having one of its ends formed upon one upper corner of each of the end feet; a cross-bar arranged between the handles; a second member having two handles, each of which has one of its ends pivotally held to the corner of one of the end feet opposite to the handles thereof so as to be moved in relative relation to the first member; a guide bar provided between the handles of the second member and having a slot provided lengthwise thereof; a plurality of cone-shaped blades each having one end thereof fastened at spaced intervals upon one edge of the guide bar, each of the cone-shaped blades having a pointed free end which is disposed on alinement with the lower edges of the end feet of the first member; and a plurality of pairs of flat blades of like formation, each pair having substantially the center of the blades thereof pivoted to the opposite surfaces of the end of each of the cone-shaped blades which is fastened to the guide bar and each blade of said pairs of blades having a pointed free end adapted when moved to contact with the pointed end of each of the cone-shaped blades and the opposite ends of all of said pairs of blades being disposed in the slot of the guide bar of the second member.

5. A machine scissors of the character described, comprising a frame composed of two members, one of said members having two substantially rectangular end plates; two handles, each having one of its ends formed upon one upper corner of each of the end plates; a cross-bar arranged between the handles; two stops, each projecting from the cross-bar at the ends thereof; a second member having two handles, each of which has one of its ends pivotally held to the corner of one of the end plates opposite to the handles thereof so as to be moved in relative relation to the first member; a guide bar provided between the handles of the second member and having an opening provided lengthwise thereof; a plurality of cone-shaped blades each having one end thereof fastened at spaced intervals upon one edge of the guide bar, each of the cone-shaped blades having a tapered pointed free end which is disposed on alinement with the lower edges of the end plates of the first member; a plurality of pairs of flat blades of like formation, each pair having substantially the center of the blades thereof pivoted to the opposite surfaces of the end of each of the cone-shaped blades which is fastened to the guide bar and each blade of said pairs of blades having a tapered pointed free end adapted when moved to contact with the pointed end of each of the cone-shaped blades and the opposite ends of all of said pairs of blades being disposed in the opening of the guide bar of the second member; and means provided between the cross-bar of the first member and guide bar of the second member and adapted to yieldingly hold the handles of said members in separated positions.

6. A machine scissors of the character described, comprising a frame composed of two members, one of said members having two substantially rectangular end plates; two handles, each having one of its ends formed upon one upper corner of each of the end plates; a cross-bar arranged between the handles; a second member having two handles, each of which has one of its ends pivotally held to the corner of one of the end plates opposite to the handles thereof so as to be moved in relative relation to the first member; a guide bar provided between the handles of the second member and having an opening provided lengthwise thereof; a plurality of short arms, each having one of its ends held at spaced intervals at one edge of the guide bar; a plurality of cone-shaped blades, each having one end thereof fastened upon the opposite end of each of the short arms, each of the cone-shaped blades having a pointed free end which is disposed on alinement with the lower edges of the end plates of the first member; a plurality of pairs of flat blades of like formation, each pair having substantially the center of the blades thereof pivoted to the opposite surfaces of the end of each of the cone-shaped blades which is fastened to the guide bar, and each blade of said pairs of blades having a pointed free end adapted when moved to contact with the pointed end of each of the cone-shaped blades and the opposite ends of all of said pairs of blades being disposed in the opening of the guide bar of the second member; and a curved spring having its central part held upon one edge of the cross-bar of the first member and having its ends engaging the guide bar of the second member whereby the handles of said members are yieldingly held apart.

This specification signed and witnessed this ninth day of March A. D. 1911.

AUGUST ROELANTS.
HENRI HENEBIENS.

Witnesses:
ROBT. B. ABBOTT,
E. M. JERKE.

---

Copies of this patent may be obtained for five cents each, by addressing the "Commissioner of Patents, Washington, D. C."